(12) United States Patent
Olaru

(10) Patent No.: US 10,471,637 B2
(45) Date of Patent: Nov. 12, 2019

(54) SIDE GATING HOT RUNNER APPARATUS WITH CONTINUOUS VALVE PIN MOVEMENT

(71) Applicant: Otto Männer Innovation GmbH, Bahlingen am Kaiserstuhl (DE)

(72) Inventor: Gheorghe (George) Olaru, Freiburg (DE)

(73) Assignee: OTTO MÄNNER INNOVATION GMBH, Bahlingen (DE)

( * ) Notice: Subject to any disclaimer, the term of this patent is extended or adjusted under 35 U.S.C. 154(b) by 681 days.

(21) Appl. No.: 15/089,421

(22) Filed: Apr. 1, 2016

(65) Prior Publication Data

US 2016/0288389 A1    Oct. 6, 2016

(30) Foreign Application Priority Data

Apr. 2, 2015   (EP) ...................................... 15162509

(51) Int. Cl.
*B29C 45/27*     (2006.01)
(52) U.S. Cl.
CPC ............................. *B29C 45/2735* (2013.01)
(58) Field of Classification Search
CPC ............ B29C 45/2735; B29C 45/2806; B29C 45/281; B29C 2045/2872
See application file for complete search history.

(56) References Cited

U.S. PATENT DOCUMENTS

| 4,013,393 | A | * | 3/1977 | Gellert ................... B29C 45/27 425/566 |
| 6,294,122 | B1 | | 9/2001 | Moss et al. |
| 7,275,923 | B2 | | 10/2007 | Tooman et al. |
| 9,205,587 | B2 | * | 12/2015 | de Oliveira Antunes ................... B29C 45/76 |
| 9,272,453 | B1 | * | 3/2016 | Keir ................... B29C 45/2806 |
| 2003/0170340 | A1 | * | 9/2003 | Sicilia ................... B29C 45/278 425/566 |
| 2007/0273060 | A1 | * | 11/2007 | Doyle ................... B29C 45/27 264/40.7 |

(Continued)

FOREIGN PATENT DOCUMENTS

| DE | 19956215 A1 | 6/2001 |
| GB | 2496219 A | 5/2013 |

(Continued)

*Primary Examiner* — Nahida Sultana
(74) *Attorney, Agent, or Firm* — Slayden Grubert Beard PLLC

(57) ABSTRACT

Actuator for a hot runner injection molding apparatus, comprising at least one nozzle for side gating with at least one valve gate comprising a valve pin for closing a communication opening in a mold cavity, a valve pin actuating means coupled with the at least one valve pin, which is moveable back and forth along a first axis (A), whereby the at least one valve pin is moveable along a second axis (B), which is arranged at an angle (α) to the first axis (A), and an actuator for driving the valve pin actuating means. The available speed of moving the valve pins and the possibility of multiple locations of positioning the valve pins relative to the mold gates ensures a a reduction of the injection pressure in the mold cavity and thus a reduction of mold core shifting, the possibility to fill at the same time mold cavities of different sizes and allows for defect free molded parts.

8 Claims, 14 Drawing Sheets

(56) References Cited

U.S. PATENT DOCUMENTS

| | | | |
|---|---|---|---|
| 2008/0152752 A1* | 6/2008 | Klobucar | B29C 45/2735 425/549 |
| 2008/0160125 A1* | 7/2008 | Fairy | B29C 45/2735 425/145 |
| 2008/0199553 A1 | 8/2008 | Fairy | |
| 2014/0037781 A1 | 2/2014 | Bazzo | |
| 2014/0306365 A1* | 10/2014 | Duffy | B29C 45/1603 264/40.7 |
| 2014/0327173 A1* | 11/2014 | Jenko | B29C 45/2806 264/161 |
| 2015/0151473 A1* | 6/2015 | Olaru | B29C 45/281 264/328.1 |
| 2015/0197049 A1* | 7/2015 | Olaru | B29C 45/2735 425/144 |
| 2015/0224692 A1 | 8/2015 | Manz | |
| 2016/0144543 A1* | 5/2016 | Galati | B29C 45/2806 264/328.1 |
| 2017/0305052 A1* | 10/2017 | de Oliveira Antunes | B29C 45/77 |
| 2017/0341283 A1* | 11/2017 | Tan | B29C 45/281 |
| 2018/0111300 A1* | 4/2018 | Galati | B29C 45/281 |
| 2018/0264701 A1* | 9/2018 | Galati | B29C 45/7613 |
| 2019/0009445 A1* | 1/2019 | Galati | B29C 45/76 |
| 2019/0184617 A1* | 6/2019 | de Oliveira Antunes | B29C 45/7613 |

FOREIGN PATENT DOCUMENTS

| | | |
|---|---|---|
| JP | H06114887 | 4/1994 |
| WO | 0035655 A1 | 6/2000 |
| WO | 2012125430 A1 | 9/2012 |
| WO | 2014036663 A1 | 3/2014 |
| WO | 2014120629 A1 | 8/2014 |
| WO | 2016039982 A1 | 3/2016 |

* cited by examiner

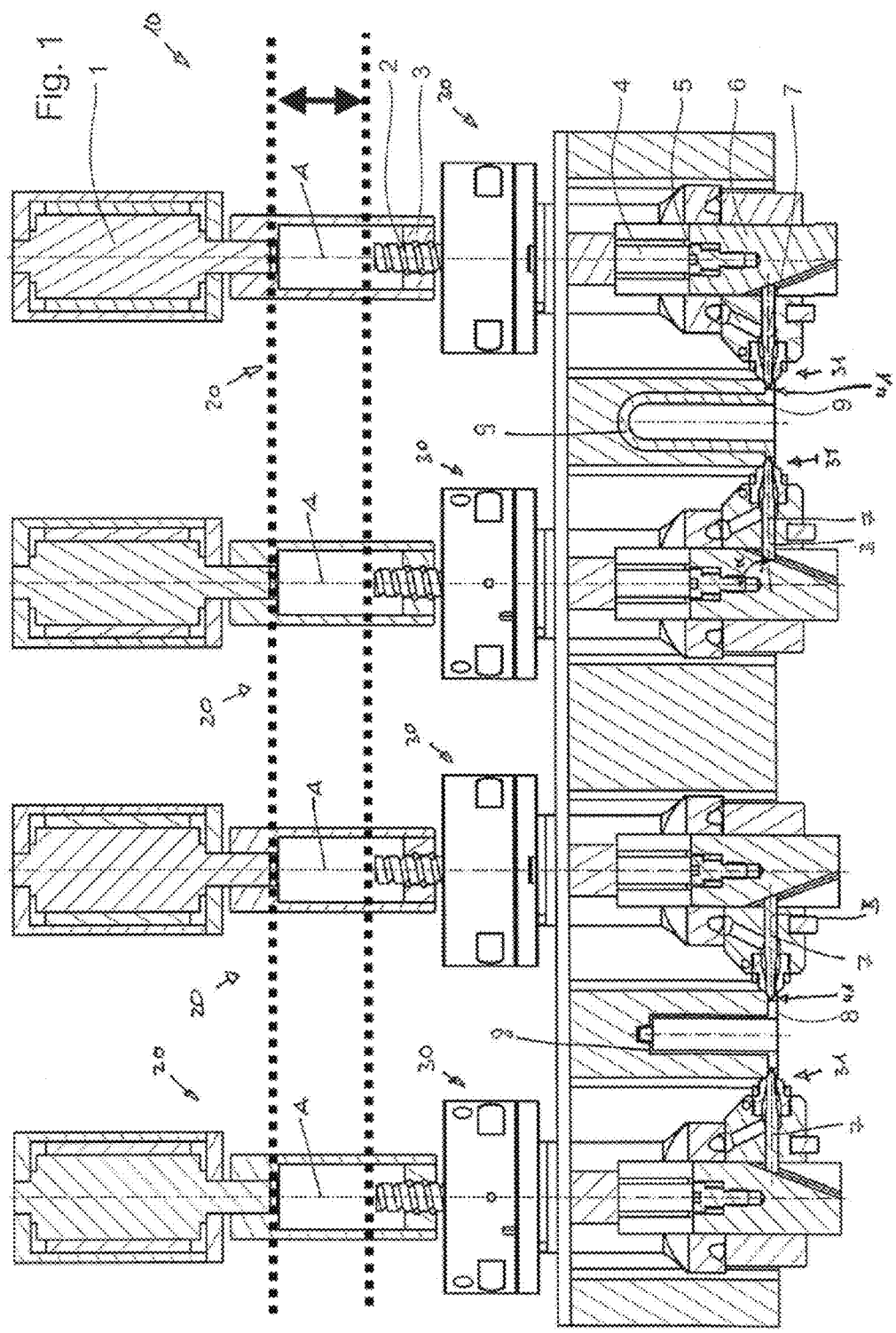

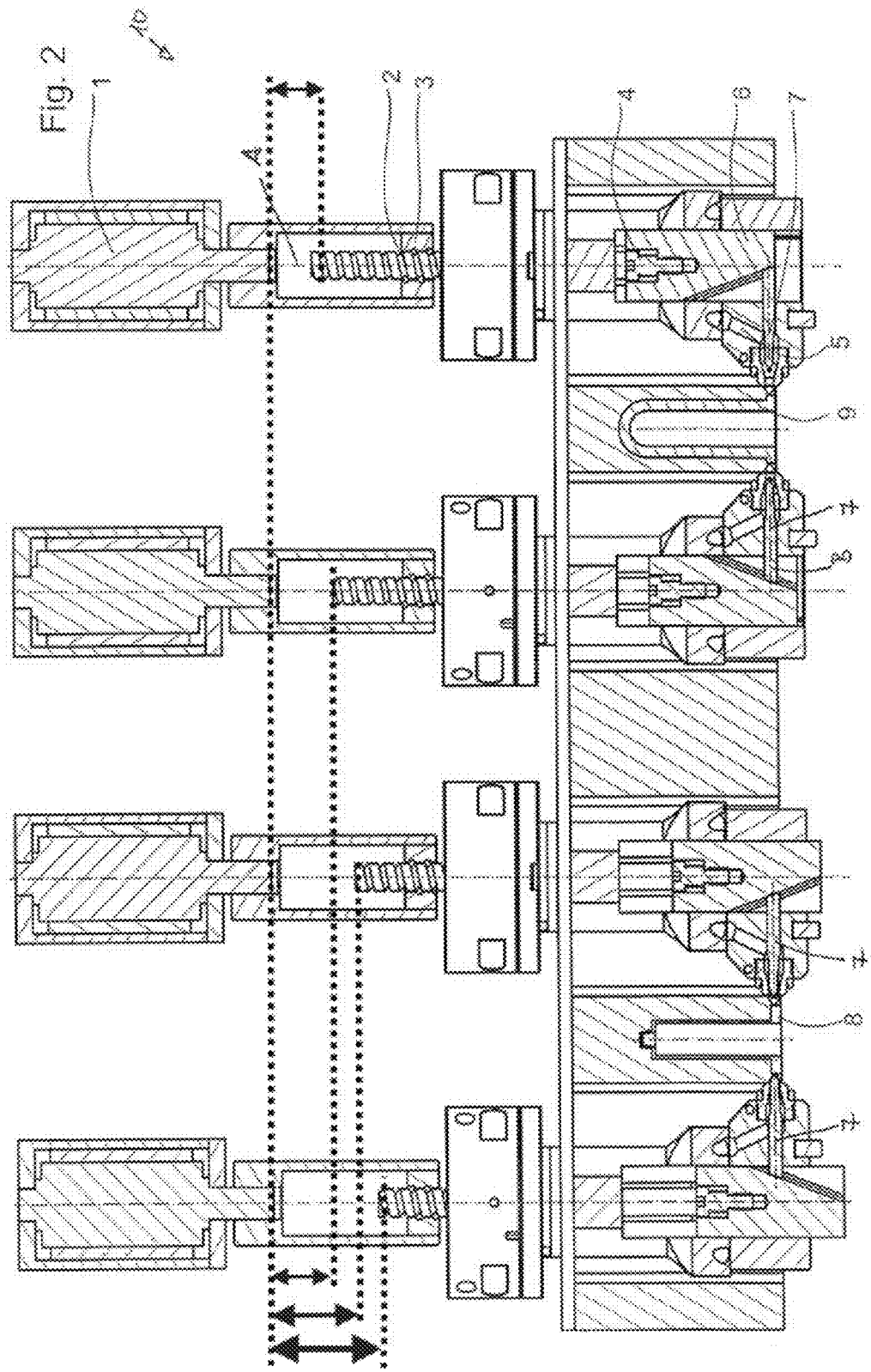

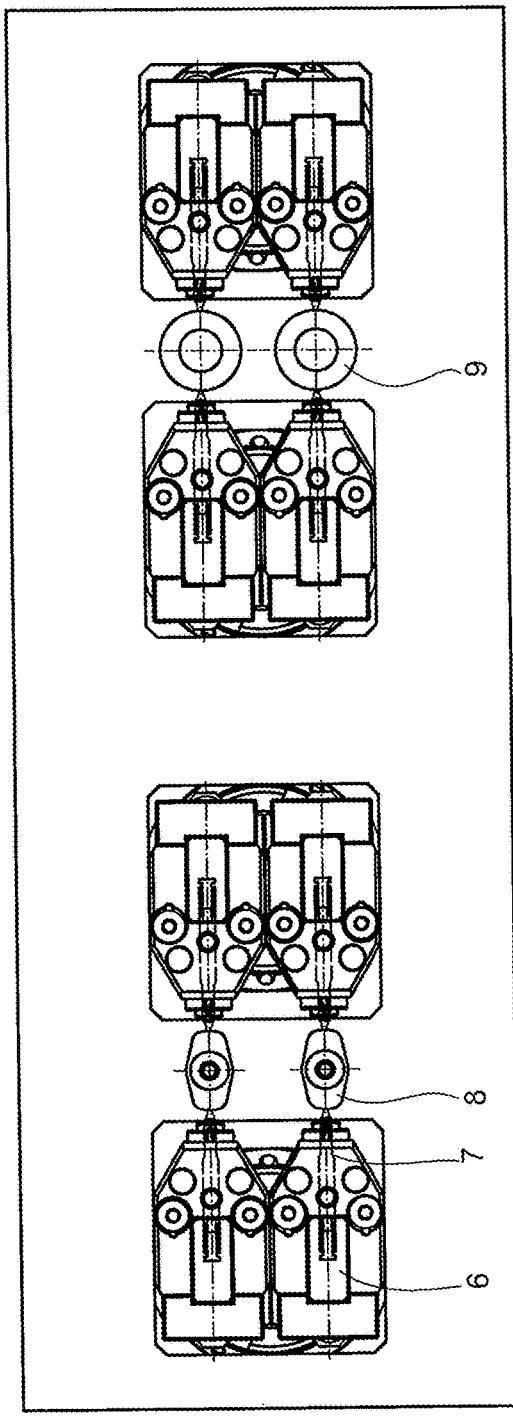
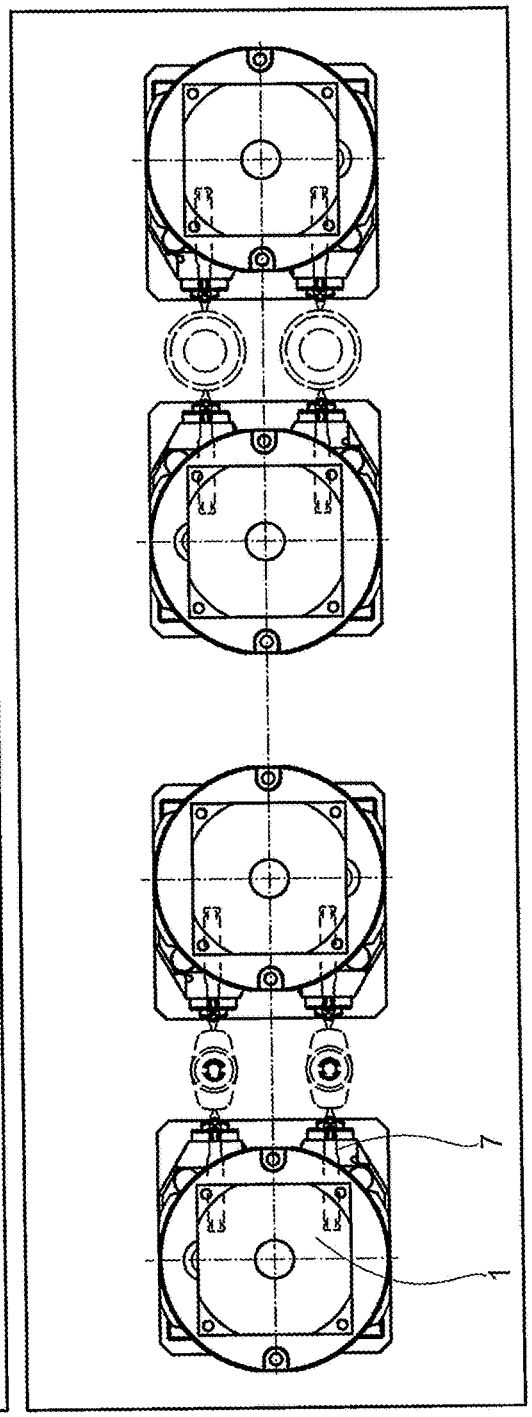

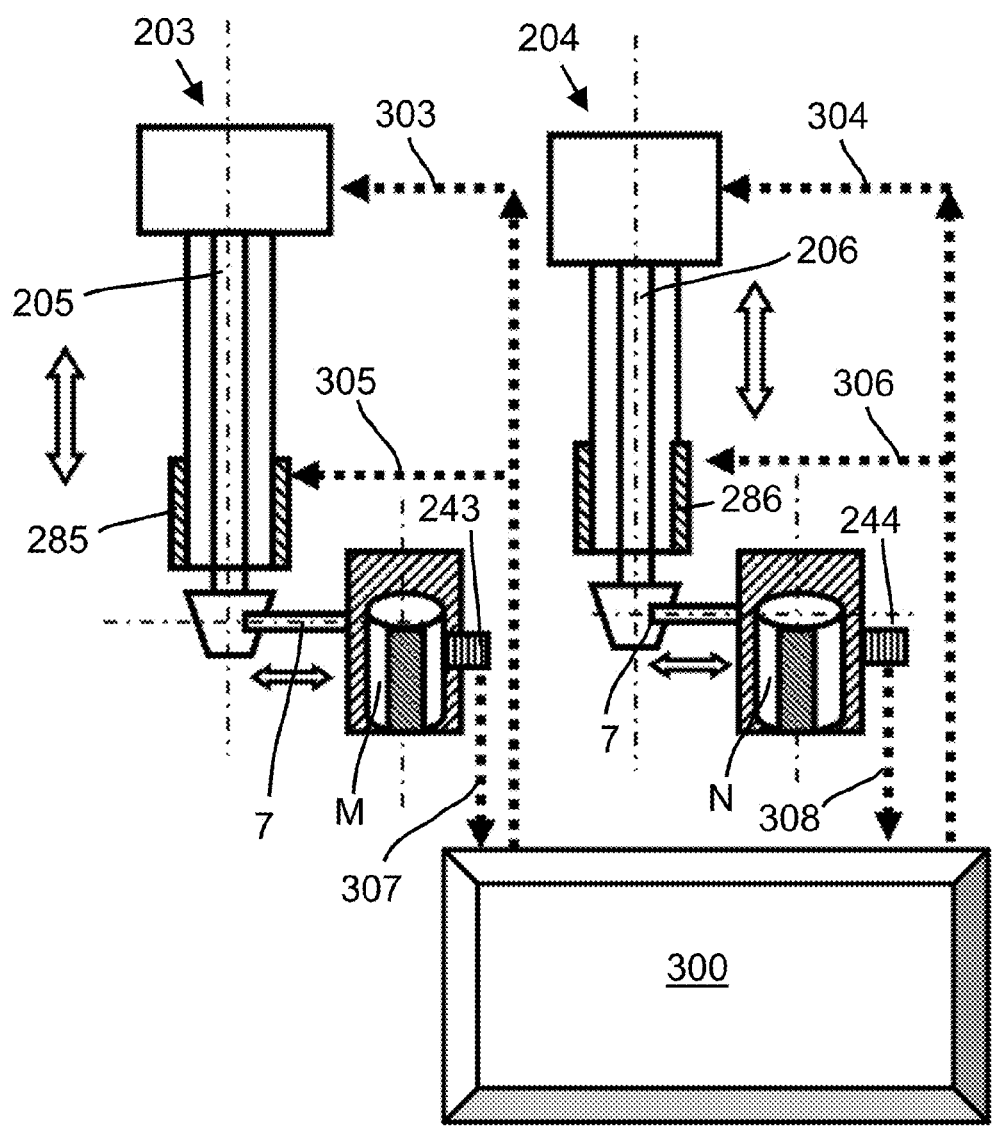

SIDE GATING HOT RUNNER APPARATUS WITH CONTINUOUS VALVE PIN MOVEMENT

CROSS-REFERENCE TO RELATED APPLICATIONS

This application claims the benefit of European Patent Application No. 15 162 509.2 filed Apr. 2, 2015. The contents of the aforesaid application as well as application for patent "SIDE GATING HOT RUNNER APPARATUS WITH CONTINUOUS VALVE PIN MOVEMENT", as filed today with the German Patent and Trademark Office having applicant reference OM431-P31088DE00, are hereby incorporated by reference in their entirety for all purposes to the extent that such contents are not inconsistent with the present application.

TECHNICAL FIELD

This invention is related to methods of injection molding for side gating applications and related actuators for associated hot runner nozzles, where each nozzle includes at least one valve pin per one mold gate.

BACKGROUND

Side gating injection molding is a known molding technique that from a mold flow prospective, before and inside the mold cavity, is very different form the axial injection molding.

Current hot runner nozzles for side gating applications using valve pins are unable to provide a continuous movement and unlimited positioning of the valve pins relative to a single mold gate, from a fully open position to a fully closed position of the mold gates and along any other position in between these extreme positions, to be able to control continuously the filling of each mold cavity.

For this reason, current hot runner nozzles for side gating applications using valve pins are unable to produce within a single cycle molded parts of different sizes that require different amounts of molten material to be injected between various cavities.

Furthermore, current hot runner nozzles for side gating applications using valve pins are not configured to prevent or reduce the mold core shift caused by the melt flowing under high injection pressure through the mold gate that hits the mold core under an angle with respect to an axis of the mold core.

Furthermore, current hot runner nozzles for side gating applications using valve pins are not configured to balance the mold flow from a plurality of nozzles into a plurality of mold cavities.

Therefore a need exists to provide improved actuators for a hot runner injection molding apparatus for the manufacture of injection molding parts that will overcome the shortages of the known art.

SUMMARY

The following summary is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the invention, a hot runner injection apparatus for side gate molding of a plurality of parts in a plurality of separate mold cavities is provided, the apparatus comprising a plurality of mold cavities, a plurality of hot runner nozzles, a plurality of valve pins and a plurality of valve pin drivers associated with the plurality of hot runner nozzles and a plurality of independent actuators for displacing the valve pin drivers.

Each of the plurality of mold cavities comprises a mold core and a mold gate.

Each of the plurality of hot runner nozzles has a first melt channel along a first axis (A) and a second melt channel along a second axis (B). The second melt channel is located in a nozzle tip positioned in the proximity of a mold gate.

The plurality of valve pins and the plurality of valve pin drivers according to this aspect are associated with the plurality of hot runner nozzles to control individually the amount of a molten material entering each mold cavity via the hot runner nozzles and to control individually the timing for injecting the molten material and for blocking a flow of molten material in each mold cavity independently, where each valve pin is continuously coupled with a valve pin driver. The valve pin driver is moveable back and forth along the first axis (A), whereby the valve pin is moveable along the second axis (B). The second axis (B) is arranged at an angle ($\alpha$) with respect to the first axis (A).

The hot runner injection apparatus according to this aspect comprises a plurality of independent actuators for displacing the valve pin drivers along the first axis (A) and the valve pins along the second axis (B) and along a plurality of continuous and/or discrete positions relative to the mold gate. The actuators are configured to displace the valve pins at least between:
i) a fully open position,
ii) a fully closed position where a tip portion of the valve pin enters the mold cavity,
iii) a subsequent closed position where the tip portion of the valve pin is moved outside the mold cavity and inside the mold gate,
iv) a position closer to the gate than the full open position to control the rate of flow before the full closing position of the valve pin.

The actuators are configured to adjust the speed of the valve pins movement relative to the mold gates and relative between the nozzles when the valve pins are moved from one position to another position, in particular, when the valve pins are moved from the fully open position to the fully closed position.

According to the present aspect, the proposed hot runner injection apparatus for side gate molding of a plurality of parts in a plurality of separate mold cavities may enable in at least one embodiment an advantageous speed of moving the valve pins and allows for multiple locations of positioning the valve pins relative to the mold gates. This may involve a reduction of mold core shifting, the possibility to fill at the same time mold cavities of different sizes and may enable defect free molded parts.

The present aspect may enable to coordinate the position of each valve pin for controlling the flow of molten material into each single mold cavity independently. Additionally, the moving speed of the valve pins may be adaptable to the needs of different cavity sizes and flow speeds of molten material into the cavity for preventing core shift as well as providing a proper filling process of the cavity. Therefore and at least in one embodiment, different products may be produced in one injection mold having different cavities at one injection step.

This aspect and other aspects of the invention will be apparent from and elucidated with reference to the embodiments described hereinafter.

BRIEF DESCRIPTION OF THE DRAWINGS

In the drawings,

FIG. 1 shows an exemplary embodiment of a hot runner injection molding apparatus with four electric actuators for four side gating hot runner nozzles;

FIG. 2 shows the hot runner injection molding apparatus from FIG. 1 with different positions of the valve pins of the nozzles;

FIG. 3 shows a bottom view of the hot runner injection molding apparatus of FIG. 1;

FIG. 4 shows a top bottom view of the hot runner injection molding apparatus of FIG. 1;

FIG. 15 shows a schematic representation of an exemplary embodiment of a hot runner injection molding apparatus having a controller.

DETAILED DESCRIPTION OF PREFERRED EMBODIMENTS

Figure 5:
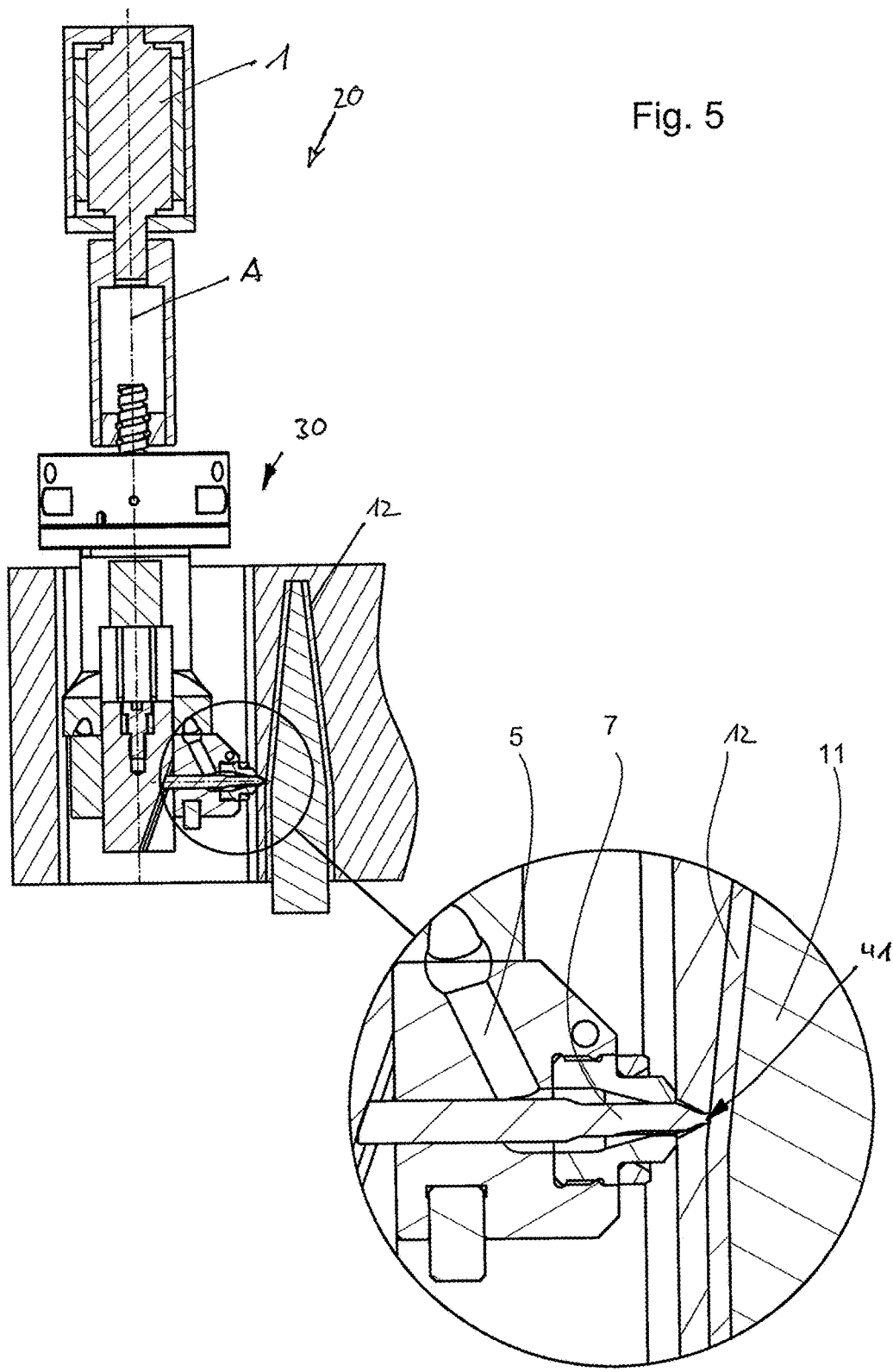
FIGS. 5 to 8 show one exemplary embodiment of a hot runner nozzle with electric actuator of the hot runner injection molding apparatus of FIG. 1 in four different actuation positions.

One embodiment of the hot runner injection apparatus comprises a process controller having a valve pin movement control module that is communication with the valve pin actuators. The adjustment of either the speed of the valve pins or the position of the valve pins or both adjustments are in particular implemented automatically to alter the injection pressure on the mold cores.

In one embodiment of the hot runner injection apparatus, a process sensor is associated with the mold cavity to measure either the temperature or the pressure or both the temperature and the pressure of the molten material, directly or indirectly.

In one embodiment of the hot runner injection apparatus, the process sensors are coupled to the controller to provide processing data used to adjust either the speed of the valve pins or the position of the valve pins or both these adjustments.

In one embodiment of the hot runner injection apparatus, the end portion of the valve pin has a cylindrical shape. This enables better esthetic results.

In one embodiment of the hot runner injection apparatus, the actuator (=actuating device) drives the valve pin driver (also known as actuation device) such, that for closing the communication opening the end portion of the valve pin goes inside the mold cavity in a closing position.

In one embodiment of the hot runner injection apparatus, the actuator drives the valve pin driver such, that the valve pin is retracted for a certain distance from its closing position into a retracted position.

In one embodiment of the hot runner injection apparatus, the actuator drives the valve pin actuation device with different speeds such, that the valve pin is retractable with any suitable speed, in particular with high, low or medium speed, depending on the injection molding application.

Further advantages, features and applications of the present invention will become apparent from the following detailed description of embodiments, which is to be taken in conjunction with the accompanying figures. In the drawings, like reference numerals refer to like parts throughout the various figures unless otherwise specified.

FIG. 1 shows an embodiment of a hot runner injection molding apparatus with four electric actuators 20 and four side gating hot runner nozzles 30. Each nozzle 30 comprises a valve gate 31 with a valve pin 7 for closing a communication opening 41 in a mold cavity 8, 9, a valve pin actuating means 6 coupled with the at least one valve pin 7, which is moveable back and forth along a first axis A, whereby the at least one valve pin 7 is moveable along a second axis B, which is arranged at an angle α to the first axis A, and an electric actuator 1 for driving the valve pin actuating means 6.

The mold cavities 8, 9 are arranged in one mold plate in an injection molding machine. All four electric actuators 20 are in a position in which the valve pins 7, which end portion has a cylindrical shape, are in a closing position. The corresponding position of the valve pin drivers 2, 3 is indicated with parallel broken lines.

FIG. 2 shows the hot runner injection molding apparatus 10 from FIG. 1 with different positions of the valve pins 7 of the nozzles 30. The electric actuator 1 comprises an electric motor with rotating drive shaft that drives a ball screw 2, 3 representing the valve pin driver 2, 3 in this exemplary embodiment for moving the valve pin actuating means 6 back and forth along the axis A. Thereby the valve pin 7 moves along the axis B, which is perpendicular to axis A in the exemplary embodiment shown.

The valve pins of the nozzles shown in FIG. 2, have different closing or opening positions, respectively. The different positions of the valve pin drivers 2, 3 are indicated with respective parallel broken lines. The valve pin 7 of the nozzle 30 at the right side is in an open position in which melt can flow into the mold cavity 9. The valve pin 7 of the nozzle next to this nozzle is already moving into a closing position. The valve pin 7 of the nozzle 30 at the left side of FIG. 1 is in a closed position. The cylindrical end portion of the valve pin 7 extends within the mold cavity. No melt can flow into the mold cavity 8. The valve pin 7 of the nozzle next to this nozzle is retracted from the closing position of the valve pin 7 of the nozzle 30 at the left side. The positions of the valve pins are due to the individual control of the electric actuator at free disposition. Therefore, the valve pin actuation device is movable with different speeds such that the valve pin is in particular retractable with any suitable speed, in particular with high, low, or medium speed, depending on the injection molding application. The speed is freely adjustable for closing and opening of the mold opening.

FIG. 3 shows a bottom view of the hot runner injection molding apparatus 10 of FIG. 1. The mold cavity 8 defines a cavity for a syringe, the mold cavity 9 defines a cavity for a test tube. FIG. 4 shows a top bottom view of the hot runner injection molding apparatus shown in FIG. 3.

FIGS. 5 to 8 show an injection molding nozzle 30 provided with a nozzle head, which has one side gating discharge opening and a valve pin 7 for closing the discharge openings. The valve pin 7 is supported in the nozzle head so as to be movable therein. At its end portion 7a adjacent the discharge openings, the valve pin 7 has a cylindrical shape.

The discharge openings of the nozzle head are provided with a communication opening 41 of a mold insert 11. The mold insert 11 has a cavity 12 into which the melt material leaving the discharge openings can be injected via the communication openings.

As shown in FIG. 5, the communication opening 41 is closed. However, the valve pin 7 is not disposed in the cavity 12, but aligning with the surface of the molded part.

Figure 6:
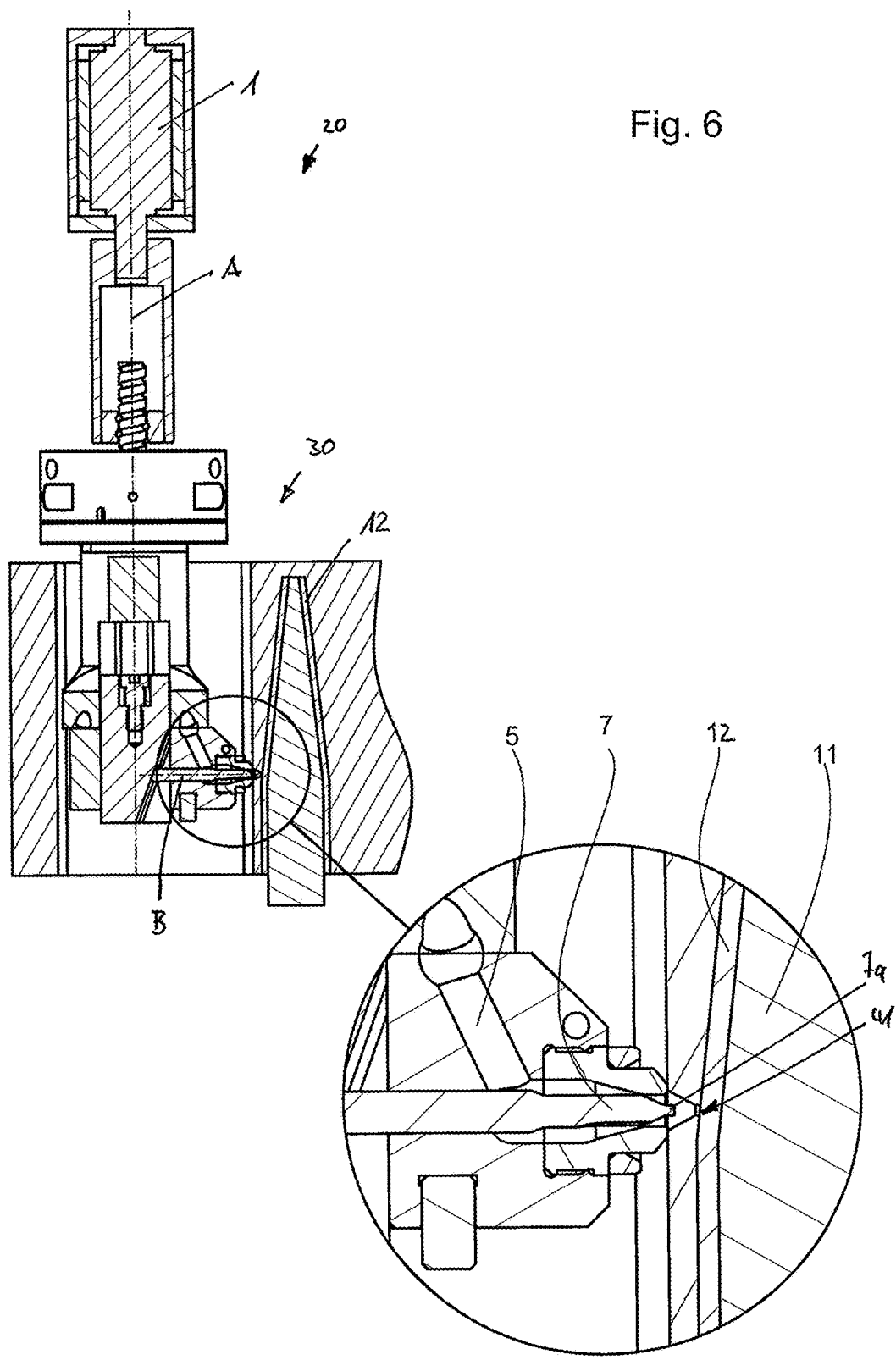

In FIG. 6, the communication opening is still closed. The valve pin 7 is disposed at a distance from the mold cavity 12 and such, at a distance from the injection-molded part. As a result, the injection-molded part can be removed from the mold without the risk of being scratched at its surface by the valve pin 7.

Figure 7:
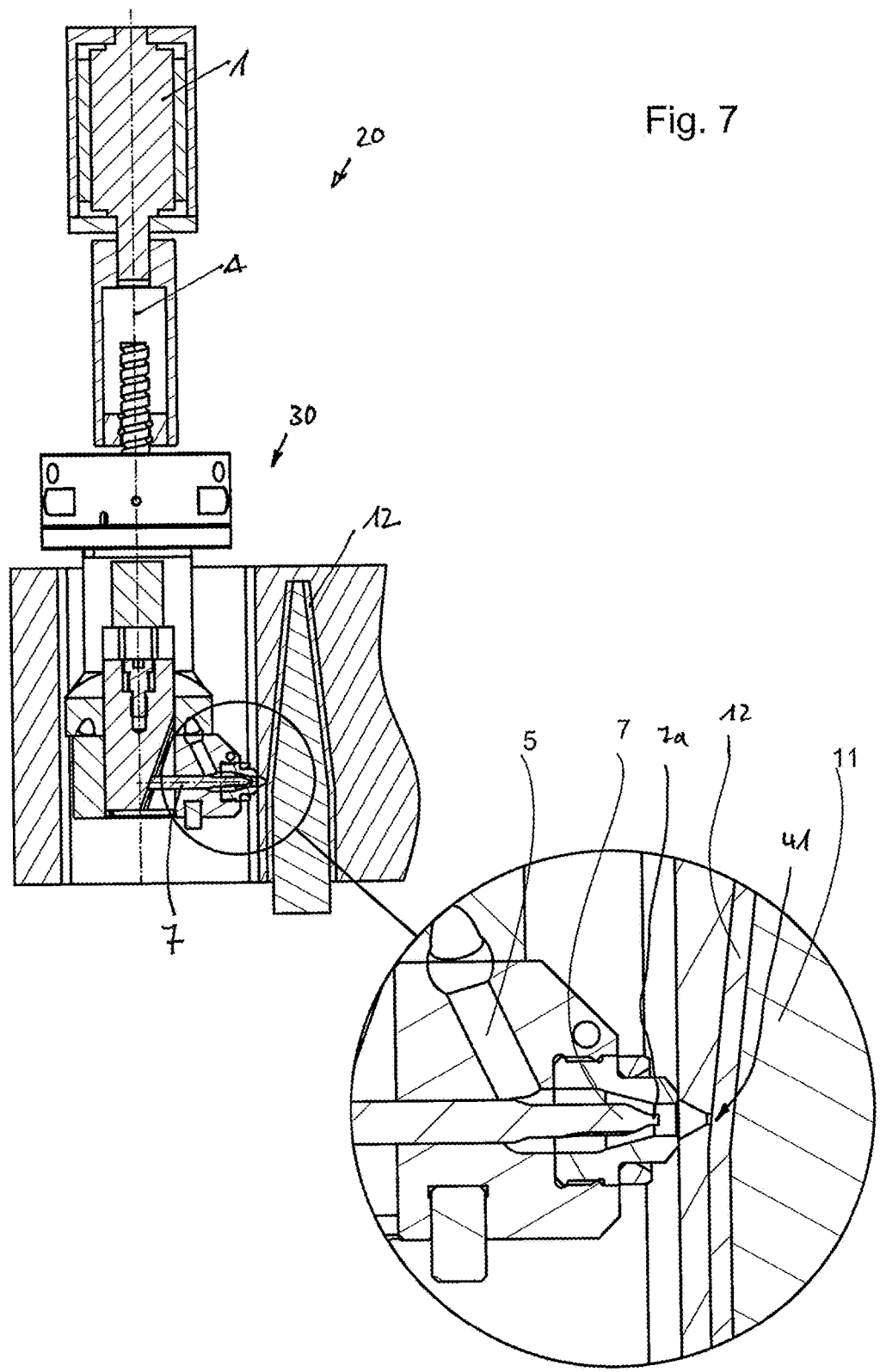

In FIG. 7, the valve pin 7 is retracted into an open position. As the retracting speed is controllable due to the electric actuator 1, the flow velocity of the melt into the cavity 12 is also controllable. In this way, injection molding difficulties like core shift can be controlled and also the filling process of asymmetric cavities having more than one mold gate can be controlled.

Figure 8:
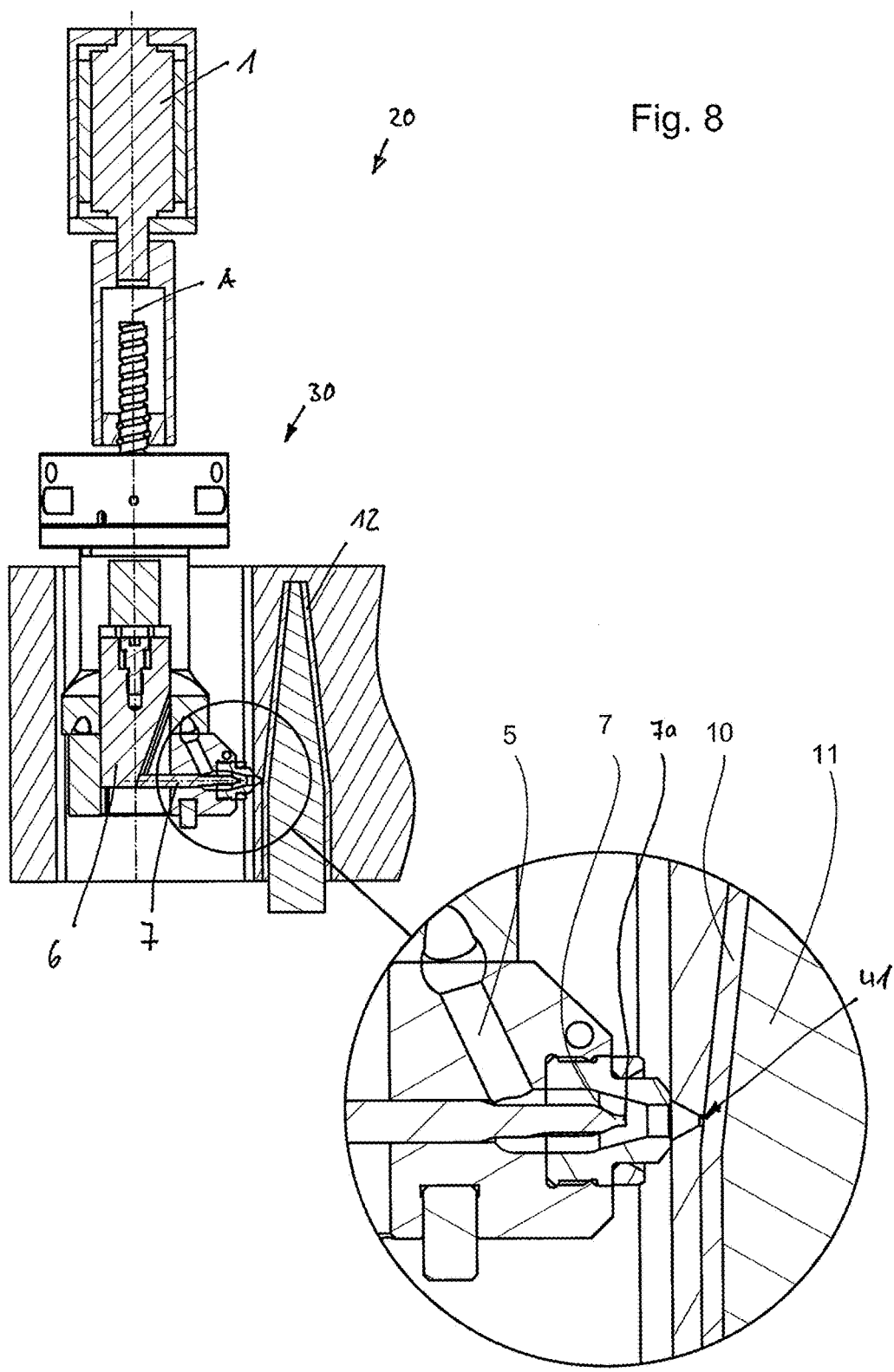

In the position shown in FIG. 8, the communication opening is fully open so that the melt can flow out of the discharge openings into the cavity 12 of the mold inserts via the communication openings.

Figure 9A:
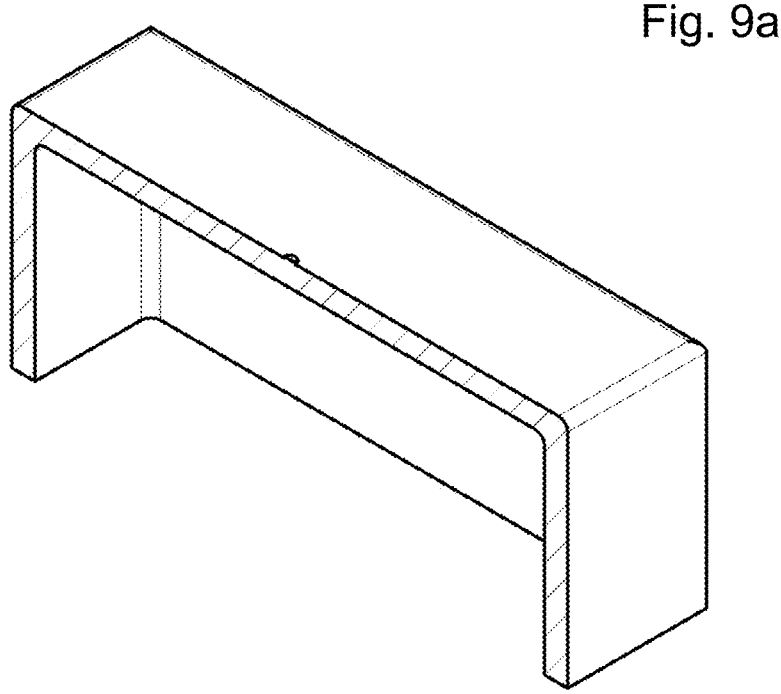
FIGS. 9a and 9b show an exemplary injection molded part having different gate marks.
Figure 9B:
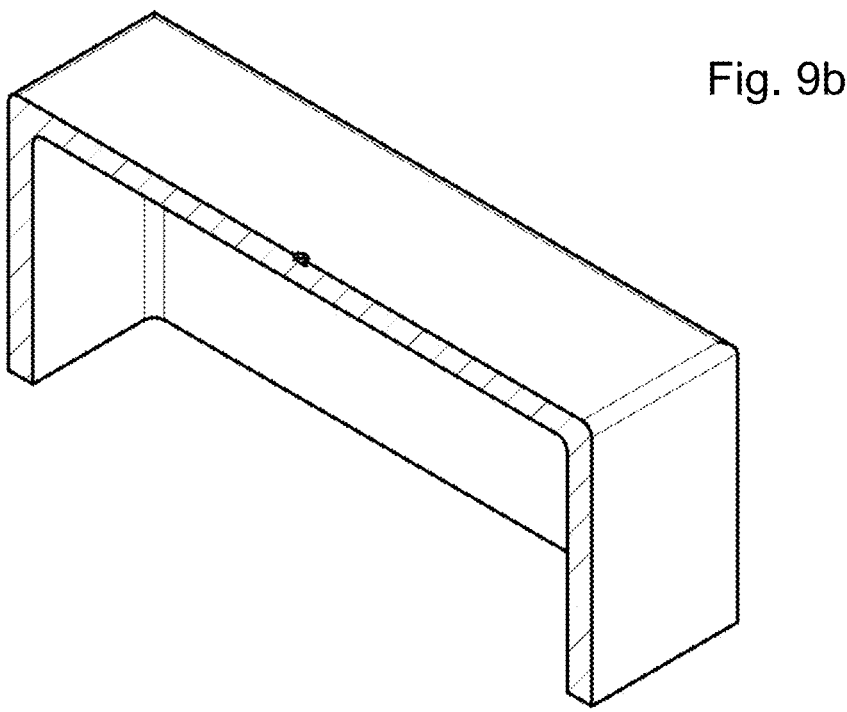

FIGS. 9a and 9b show an exemplary injection molded part having different gate marks 91, 92. As is derivable from the figures, in the injection molding process of the part 92 shown in FIG. 9b, the valve pin 7 moves further into the mold cavity 9 than the valve pin 7 in the injection molding process of the part 91 shown in FIG. 9a. As a consequence, the mark 92 is deeper than the mark 91. For example, part 91 of FIG. 9a may be a syringe with high demands on the esthetics of the mark 91 and part 92 may be a test tube with lower demands on the esthetics of the mark 92.

Figure 10:
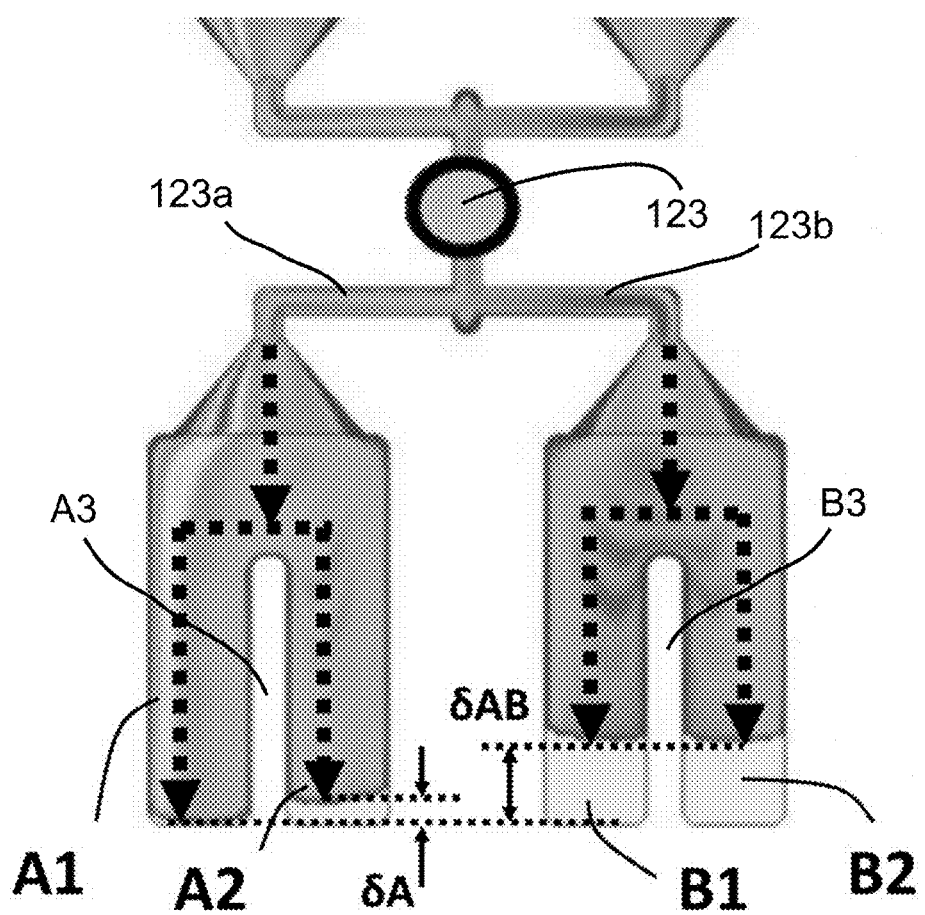
FIG. 10 shows a form filling process known in the prior art of two axial gated cavities feed from one mold gate.

FIG. 10 shows a form filling process known in the prior art of two axial gated cavities A1, A2 and B1, B2 feed from one mold gate 123. Each hollow cylindrical cavity A1, A2 and B1, B2 has a mold core A3 and B3 arranged coaxial therein. As can be seen in FIG. 10, the form filling process in cavity A1, A2, is imbalanced: the melt in area A1 has already reached the bottom of cavity A1, A2, wherein the melt in area A2 has not yet reached the bottom of cavity A1, A2. The difference is indicated with δA. This is in particular due to imbalanced flow velocities within the melt caused in particular by pressure and temperature differences of the melt influenced in particular by temperature differences of the cavity and hot runner walls and different flow lengths of the melt.

Also the form filling processes of cavity A1, A2 and cavity B1, B2 is imbalanced: The melt in cavity B1, B2 has not yet reached the bottom of cavity B1, B2, the remaining distance is indicated with δAB, which is larger than δA. This shows, that the form filling process of cavity B1, B2 is slower than the form filling process of cavity A1, A2, even though mold gate 123 is arranged with the same distance from both cavities A1, A2 and B1, B2 and the geometry of the hot runners 123a and 123b is the same.

Figure 11:
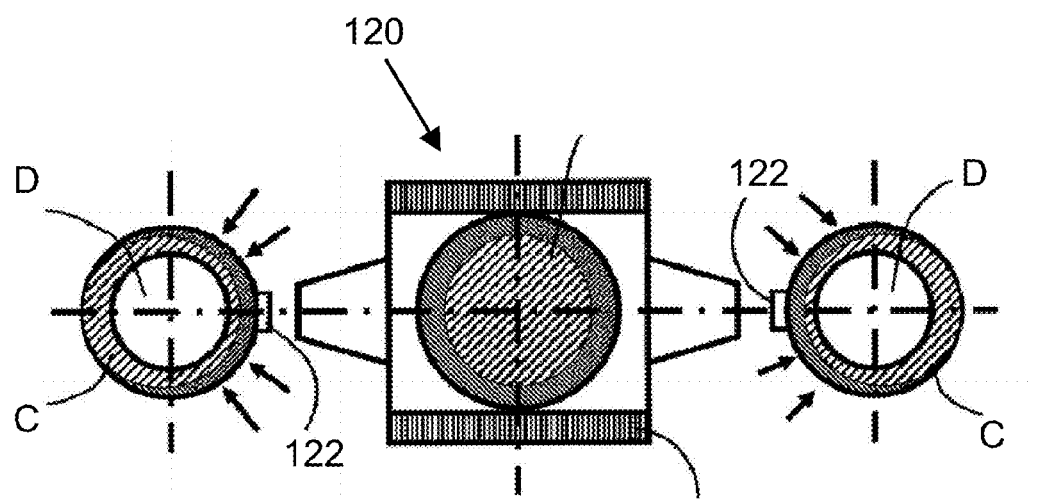
FIG. 11 shows a form filling process known in the prior art of two side gated cavities feed from a side gating nozzle.

FIG. 11 shows a form filling process known in the prior art of two side gated cavities C feed from a side gating nozzle 120. Here mold imbalance in side gating in each cavity is shown. The darker area shows a colder layer (somehow solidified) that entered first in the cavity C and the lighter area shows a layer which is hotter behind the mold core D.

In side gating the flow of plastic through the mold gate 122 is along a direction that is 90 degrees or any angle with respect to the axial axis of the mold core D. This will create in addition to an imbalance flow in the cavity C a shifting of the mold core D caused by the injection pressure and thus the molded part will have an unequal wall thickness.

By using a side gated hot runner nozzle 120 with valve pins 7 that can be moved at any speed in both open and close direction, plus the possibility to position the valve pins 7 at any distance relative to mold gate 122 in a stationary position, the amount of molten material and the pressure of the molten material entering each cavity C can be accurately controlled at any time during the filling process of each cavity C.

The amount of molten material, the speed of the molten material towards the mold core D and the injection pressure applied to the mold core can be adjusted via a controller that adjusts continuously or incrementally, in small steps, either
a) automatically, via a computer program based on preset data that takes into account the kind of the resin to be molded or the geometry of the parts; or
b) interactively, via process sensors associated with the mold cavity C that send temperature data or pressure data to a controller that can adjust for each and all valve pins their speed, or their position or both of these. This can be done in a closed loop setting or in an open loop setting. In some instances, the controller may in addition to these valve pin commands, adjust the temperature of the nozzle heaters associated with each nozzle. In such a case, if the hot runner nozzles have two independent heaters, one being operable for the nozzle body and another one in the vicinity of the mold gate, the controller may adjust only one or both heaters in coordination with the position and the speed of the valve pins.

In all these instances, the movement of the valve pins 7, either continuously or incrementally, is achieved using either pneumatic pistons or using electrical motors, each configured for injection molding applications.

Figure 12A:
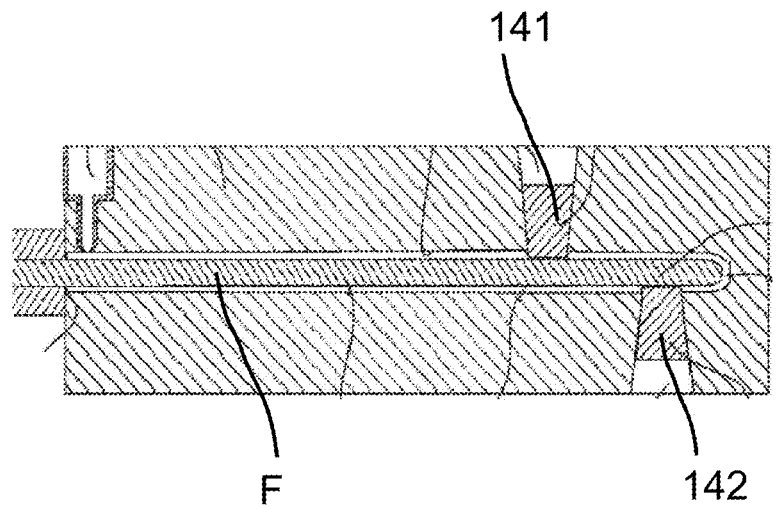
FIG. 12a shows a construction known from the prior art for preventing core shifting.

FIG. 12a shows a setup known from the prior art for preventing core shifting. This setup is known from U.S. Pat. No. 9,084,867 and shows a side gated cavity E with a mold core F arranged therein. The mold gate 124 of this side gated cavity E is arranged on the upper left side of FIG. 12a. For preventing core shift, two core supports 141, 142 are arranged at two opposite sides of the core F which keeps even the remote end of the core in its coaxial position when the melt enters the mold cavity E with high pressure and high velocity from the mold gate 124.

Figure 12B:
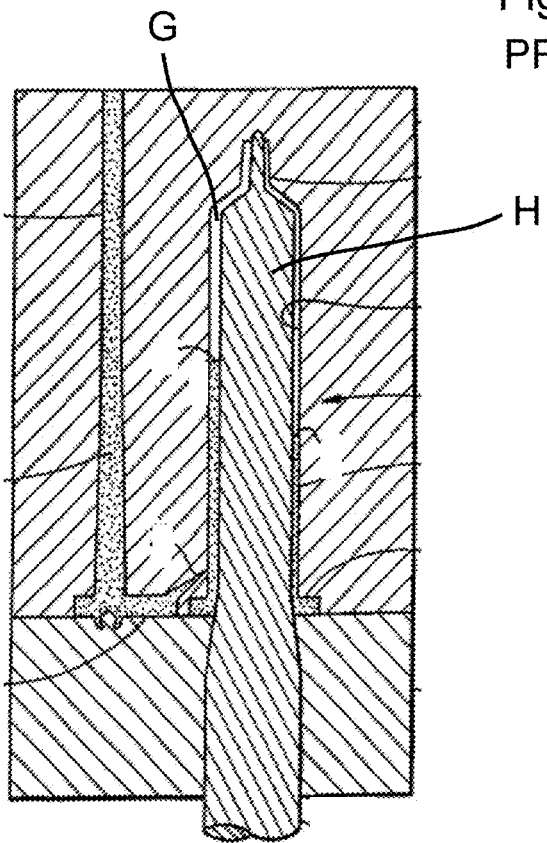
FIG. 12b shows a cavity including a core with core shifting during form filling in side gating as shown in a prior art document.

FIG. 12b shows a cavity G including a core H with core shifting during form filling in side gating. This situation is shown in U.S. Pat. No. 7,229,276. Resulting from the pressure exerted from the melt on the mold core H when entering the cavity G, the mold core H leans to the left side in FIG. 12b. Resulting from this, the wall thickness in the area on the left side of FIG. 12b will be higher than the wall thickness in the right side area of FIG. 12b.

Figure 13:
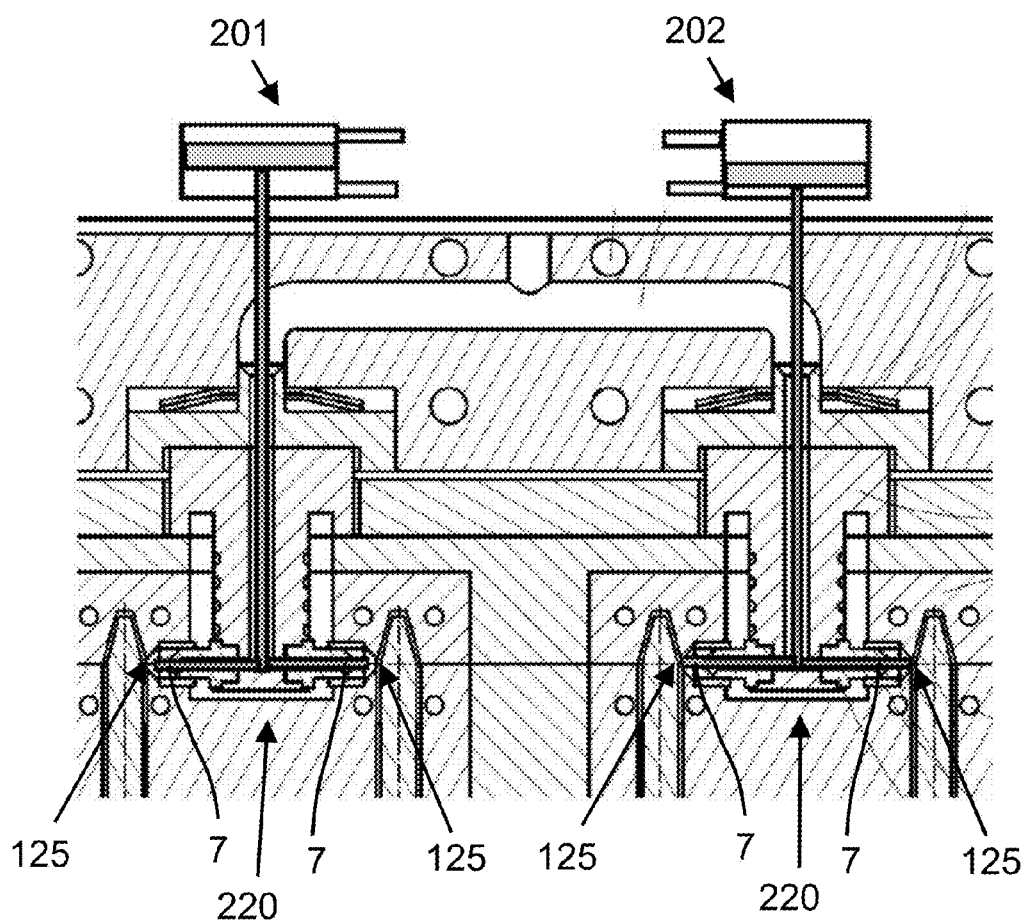
FIG. 13 shows a detail of an exemplary embodiment of a hot runner injection molding apparatus with two pneumatic actuators for two side gating hot runner nozzles.

FIG. 13 shows a detail of an exemplary embodiment of a hot runner injection molding apparatus with two pneumatic actuators 201, 202 of two side gating hot runner nozzles 220. As is shown in FIG. 13, the pneumatic actuator 201 is in an open position of the mold gate 125 (valve pins 7 are retracted from the mold gate 125) and the pneumatic actuator 202 is in a closed position of the respective mold gate 125. As the pneumatic actuators 201, 202 are individually controllable, the form filling process is individually controllable according to the needs of the mold cavities with regard to flow velocity (free cross section of the mold gate 125) and time of the form filling.

Figure 14:
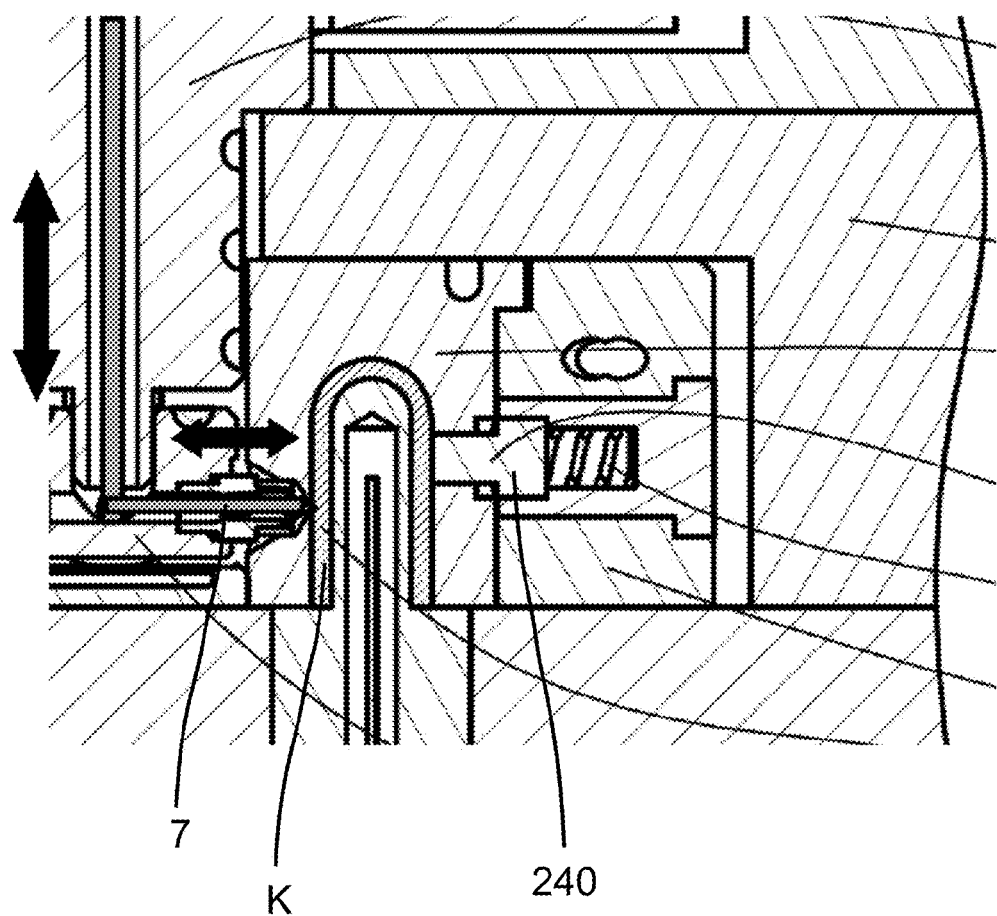
FIG. 14 shows a detail of an exemplary embodiment of a hot runner injection molding apparatus having a temperature/pressure sensor close to the mold cavity.

FIG. 14 shows a detail of an exemplary embodiment of a hot runner injection molding apparatus having a temperature/pressure sensor 240 close to the mold cavity. The sensor 240 detects information regarding the form filling process (temperature of the melt, pressure within the cavity K) and the solidification of the melt. Based on this data the movement of the valve pin 7 can be controlled according to the filling of the mold in particular with regard to imbalances during the filling process or for preventing core shift.

FIG. 15 shows a schematic representation of an exemplary embodiment of a hot runner injection molding apparatus having a controller 300. The controller 300 is connected via data link 303 to the actuator 203 and via data link 304 to the actuator 204. Actuators 203, 204 may comprise pneumatic pistons or electric motors. Further, the controller 300 is connected via data link 305 to a nozzle heater 285 and via data link 306 to a nozzle heater 286. The movement of the valve pins 7 and the valve pin drivers 205, 206 is indicated by arrows. The controller 300 is further connected via data link 307 with a temperature and/or pressure sensor 243 and via data link 308 to temperature and/or pressure sensor 244 arranged near the cavity M, N.

Controller 300 serves for controlling the valve pin movement and in some cases for controlling of the nozzle heaters which for example are arranged at the nozzle lower body portion. Controller 300 may comprise a temperature control module of the nozzle heaters 285, 286.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single device, module, section, or other unit may fulfill the functions of several items recited in the claims.

The mere fact that certain measures are recited in mutually different dependent claims does not indicate that a combination of these measures cannot be used to advantage. Any reference signs in the claims should not be construed as limiting the scope.

What is claimed is:

1. A hot runner injection apparatus for side gate molding of a plurality of parts in a plurality of separate mold cavities, the apparatus comprising:
   a plurality of mold cavities, wherein each of the plurality of mold cavities comprises at least a mold core and one or more mold gates;
   a plurality of hot runner nozzles, wherein each of the plurality of hot runner nozzles has a first melt channel along a first axis and a second melt channel along a second axis, the second melt channel being located in a nozzle tip, positioned in the proximity of one of the mold gates;
   a plurality of valve pins and a plurality of valve pin drivers associated with the plurality of hot runner nozzles to control individually the amount of a molten material entering each of the plurality of mold cavities and the timing for injecting the molten material and for blocking a flow of molten material in each mold cavity independently, where each of the plurality of valve pins is coupled with one valve pin driver of the plurality of valve pin drivers, the valve pin driver being moveable back and forth along the first axis, whereby the plurality of valve pins are moveable along the second axis, which is arranged at an angle with respect to the first axis;
   a plurality of independent actuators for displacing the valve pin drivers along the first axis and the valve pins along the second axis and along a plurality of continuous and/or discrete positions relative to the mold gates, whereby the plurality of independent actuators are configured to displace the valve pins at least between
   i) a fully open position,
   ii) a fully closed position where a tip portion of each valve pin of the plurality of valve pins enters the mold cavity,
   iii) a subsequent closed position where the tip portion of each valve pin of the plurality of valve pins is moved outside the mold cavity and inside one of the one or more mold gates,
   iv) a position closer to the gate than the full open position to control the rate of flow before the full closing position of the valve pin; and
   whereby the plurality of independent actuators are further configured to adjust the speed of the valve pins movement relative to the mold gates and relative between the plurality of hot runner nozzles when the plurality of valve pins are moved from the fully open position to the fully closed position and whereby the position of each valve pin in the open position is adjustable either continuously or incrementally/discretely to reduce the amount of the molten material entering a corresponding mold cavity and/or to adjust the injection pressure of the molten material entering each mold cavity and thus to reduce an injection pressure force applied laterally by the molten material to the mold core.

2. A hot runner injection apparatus according to claim 1, further comprising a process controller having a valve pin movement control module that is communication with the plurality of independent actuators and whereby the adjustment of either the speed of the plurality of valve pins or the position of the plurality of valve pins or both adjustments are in particular implemented automatically to alter the injection pressure on the mold cores.

3. A hot runner injection apparatus according to claim 1, wherein a process sensor is associated with the mold cavities to measure either the temperature or the pressure or both the temperature and the pressure of the molten material, directly or indirectly.

4. A hot runner injection apparatus according to claim 3, wherein the process sensors are coupled to the controller to provide processing data used to adjust either the speed of the plurality of valve pins or the position of the plurality of valve pins or both these adjustments.

5. A hot runner injection apparatus according to claim 1, wherein the end portion of each of the plurality of valve pins has a cylindrical shape.

6. A hot runner injection apparatus according to claim 1, wherein the each of the plurality of independent actuators drive one of the plurality of valve pin drivers such, that for closing the communication opening, the end portion of one valve pin of the plurality of valve pins goes inside one of the mold cavities in a closing position.

7. A hot runner injection apparatus according to claim 1, wherein each of the plurality of independent actuators drive one of the plurality of valve pin drivers such, that the one valve pin of the plurality of valve pins is retracted for a certain distance from its closing position into a retracted position.

8. A hot runner injection apparatus according to claim 1, wherein each of the plurality of independent actuators drive one of the plurality of valve pin drivers with different speeds such, that one valve pin of the plurality of valve pins is retractable with any suitable speed, in particular with high, low or medium speed, depending on the injection molding application.

* * * * *